United States Patent [19]

Furukawa

[11] Patent Number: 4,494,149
[45] Date of Patent: Jan. 15, 1985

[54] FACSIMILE COMMUNICATION DATA RECORDING APPARATUS FOR FACSIMILE TRANSCEIVER

[75] Inventor: Noboru Furukawa, Tokyo, Japan
[73] Assignee: Ricoh Company, Ltd., Tokyo, Japan
[21] Appl. No.: 301,666
[22] Filed: Sep. 14, 1981

[30] Foreign Application Priority Data

Sep. 22, 1980 [JP] Japan ................................ 55-131974
Sep. 22, 1980 [JP] Japan ................................ 55-131975
Sep. 22, 1980 [JP] Japan ................................ 55-131976

[51] Int. Cl.³ ............................................... H04N 1/32
[52] U.S. Cl. ..................................... 358/257; 358/286
[58] Field of Search ............... 358/257, 256, 260, 261, 358/903, 286; 364/515; 382/56

[56] References Cited

U.S. PATENT DOCUMENTS

| | | | |
|---|---|---|---|
| 4,207,598 | 6/1980 | Reich et al. | 358/257 |
| 4,249,216 | 2/1981 | Kanda | 358/257 |
| 4,255,766 | 3/1981 | Matsuda et al. | 358/257 |
| 4,317,136 | 2/1982 | Keyt et al. | 358/257 |
| 4,345,276 | 8/1982 | Colomb | 358/903 |
| 4,432,020 | 2/1984 | Onose et al. | 358/257 |

Primary Examiner—John C. Martin
Assistant Examiner—Edward L. Coles
Attorney, Agent, or Firm—David G. Alexander

[57] ABSTRACT

A facsimile communication data recording apparatus includes a storage for memorizing various administrant data annexed to video data read from an original document. At every communication, administrant data are stored in the storage and, upon an increase thereof to a predetermined amount, a received data recording section of the apparatus is energized to print out the administrant data which are read from the storage. When all the administrant data are fully printed out without any trouble, the administrant data in the storage are cleared. In a preferred embodiment, a key switch for commanding an administrant data print-out operation is positioned in a suitable accessible part of the apparatus so that administrant data can be printed out selectively by closing the key switch. The data read from the storage are printed out within a predetermined area of a paper sheet in a variable arrangement which conforms to an amount of the stored data. Administrant data can be read from the storage and printed out as those concerning transmission and those concerning reception separately from each other.

12 Claims, 22 Drawing Figures

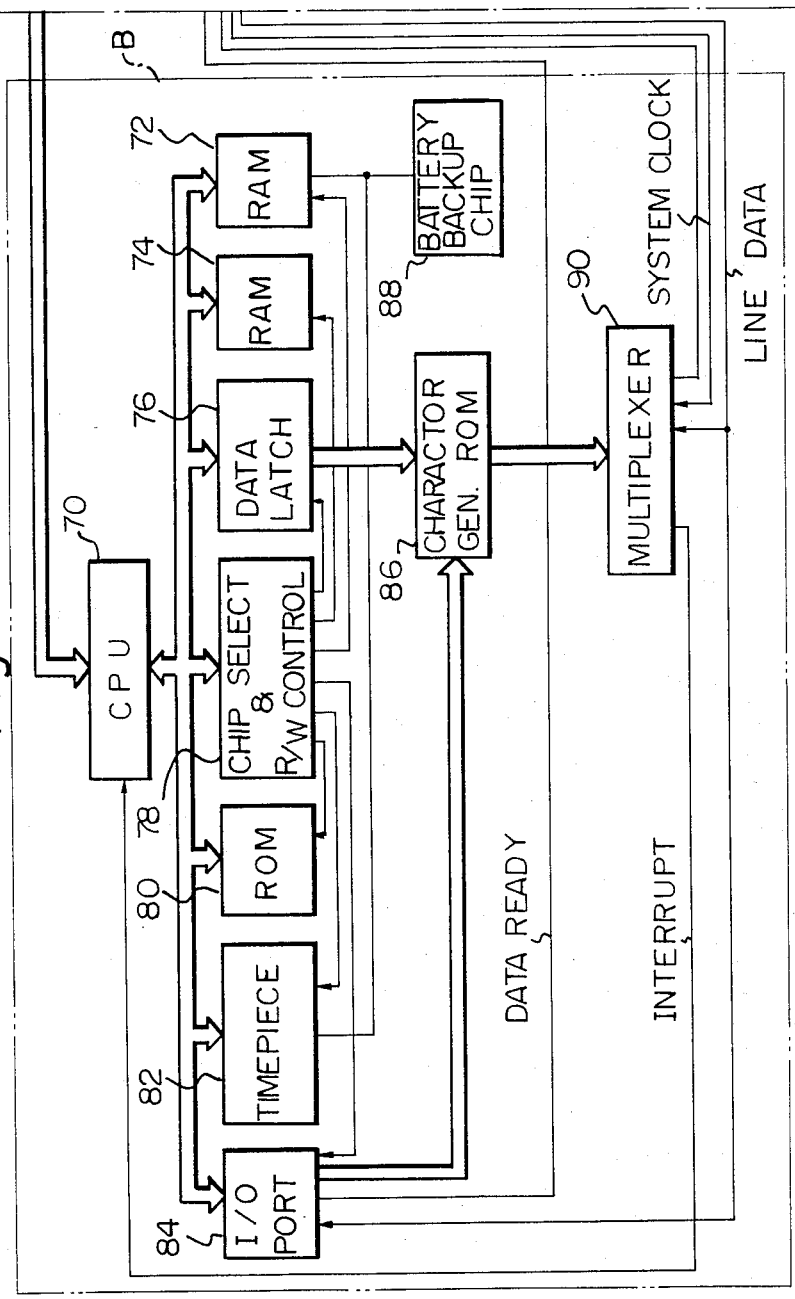

ADDRESSEE'S ID MEMORY FLOW

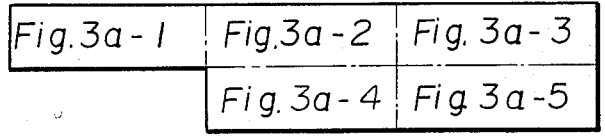
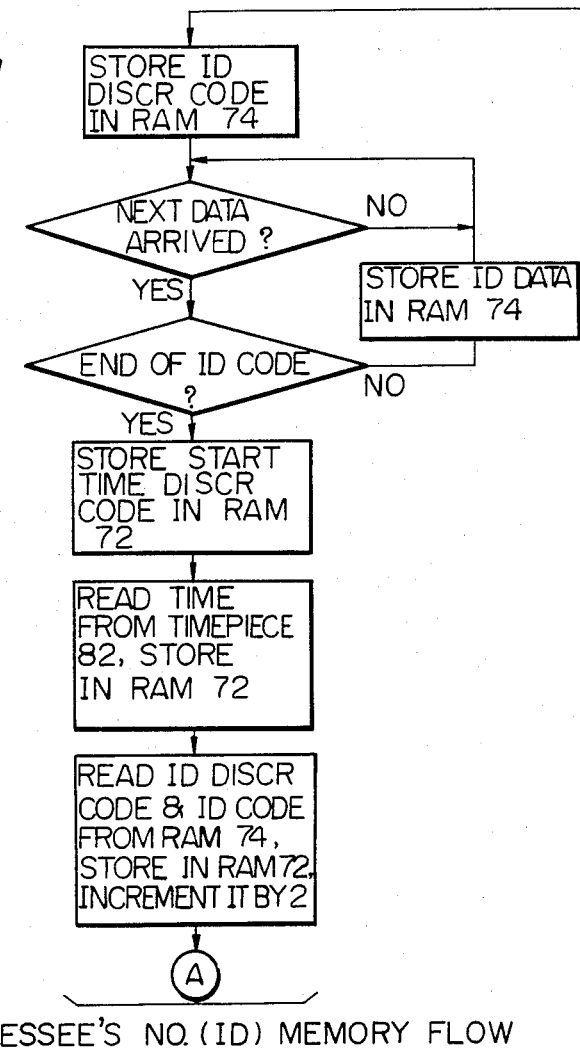
ADDRESSEE'S NO. (ID) MEMORY FLOW

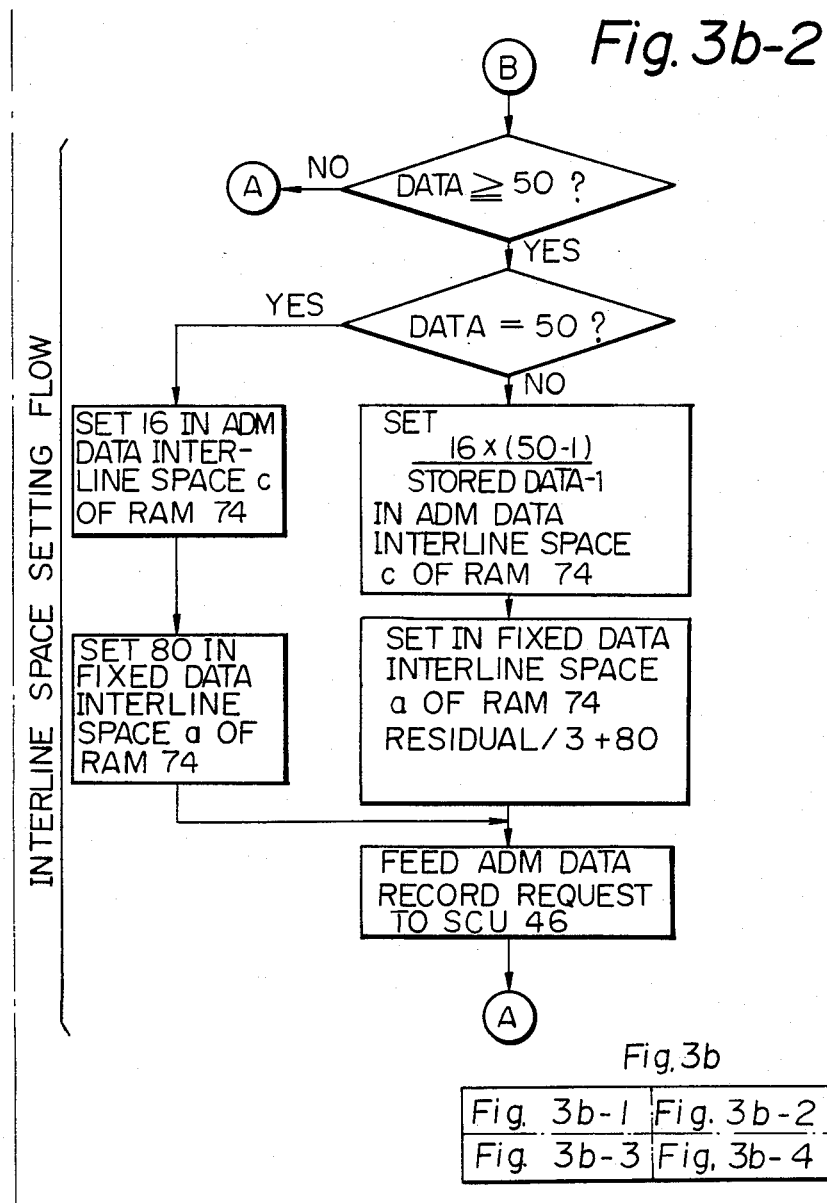

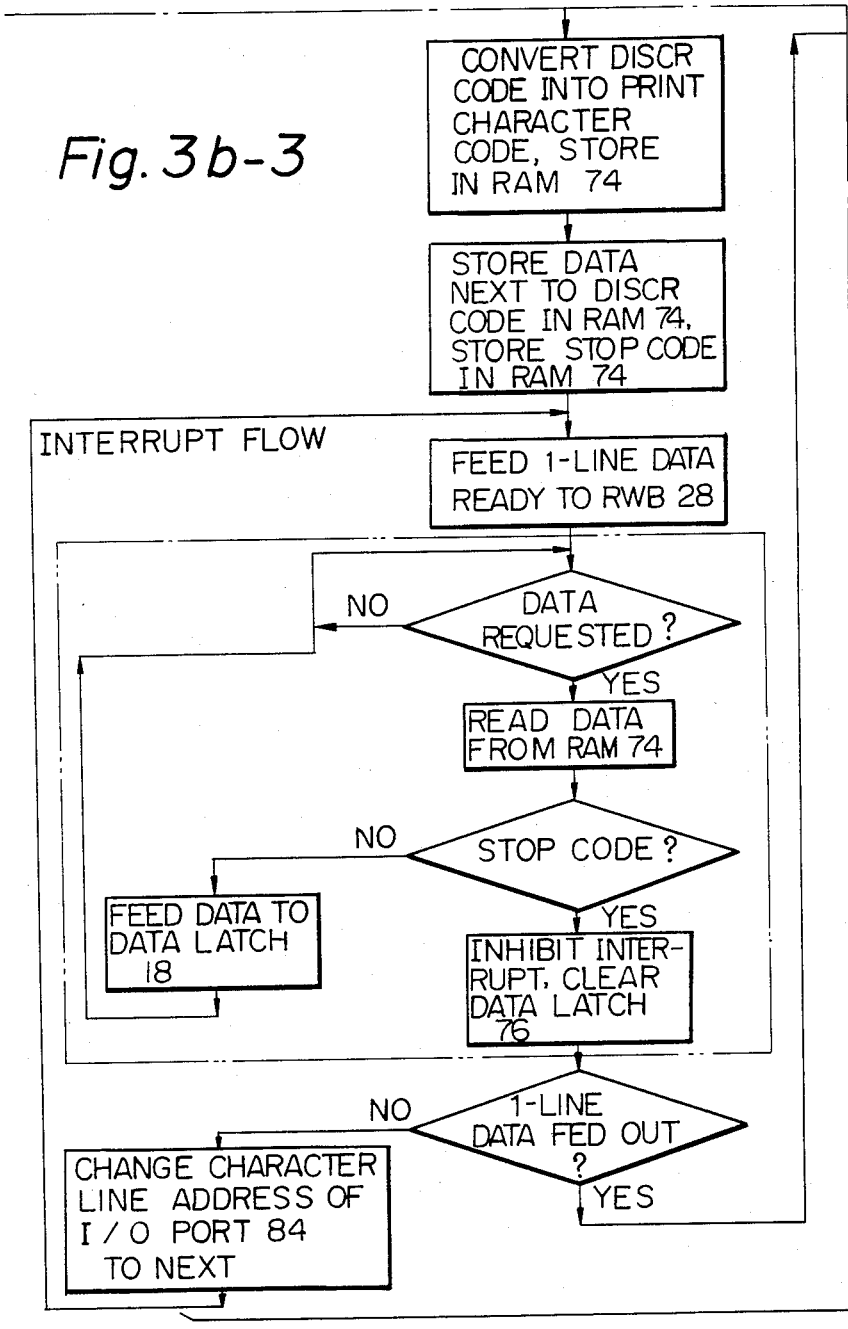

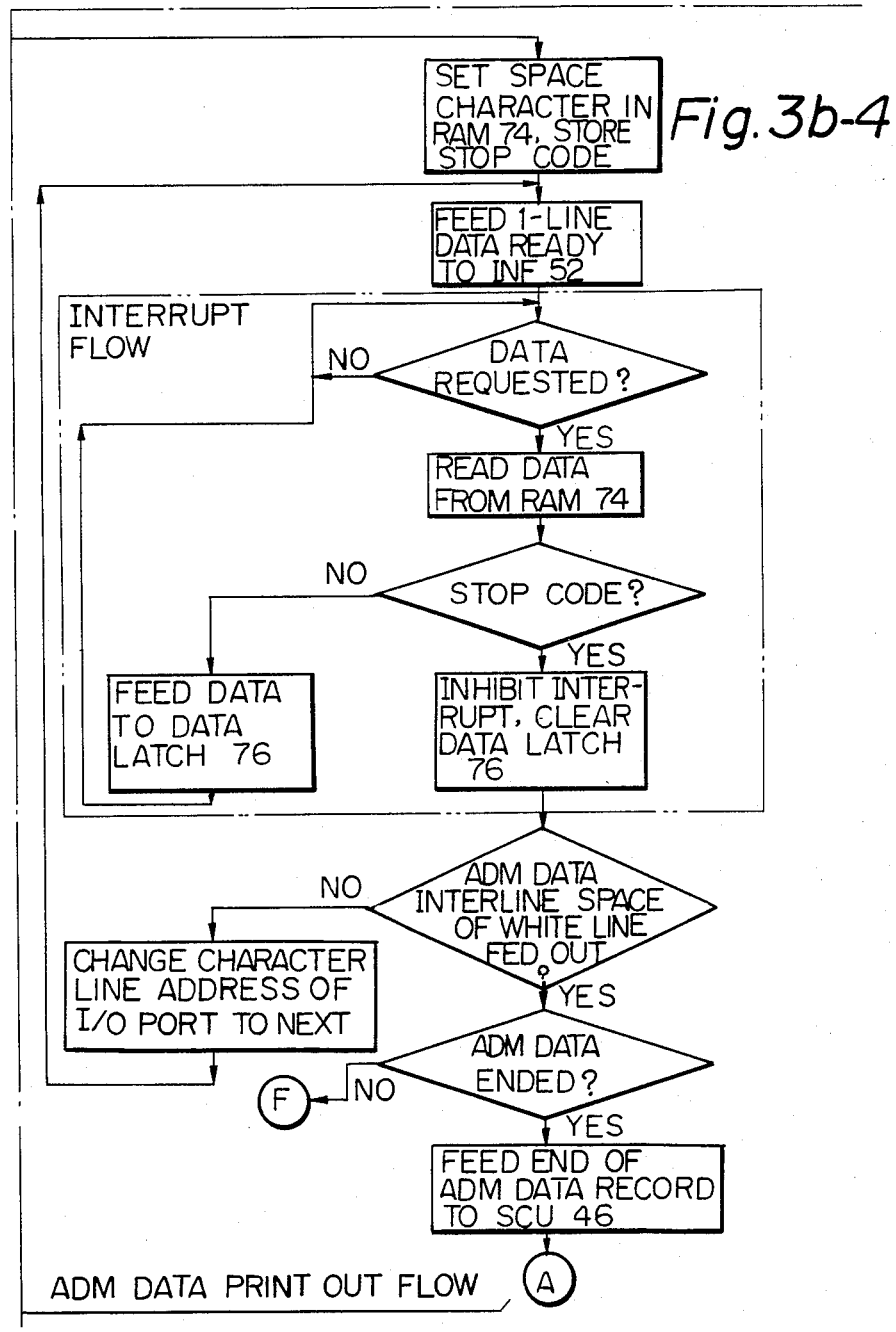

Fig. 4

FIXED DATA
- JOURNAL ~a
- PRINT OUT      MAY 03  11 20
  a⤹
- PRINTED BY   FAX NO. 1
  a⤹

ADM DATA
- 1 START   MAY 01 09:00   — 1st ROW
  c⤹
    FROM   TOKYO FAX NO.1   — 2nd ROW
  ⋮
- 10 START    MAY 03  10:59   — 50th ROW
    TO      OSAKA             — 51st ROW
  TOTAL NUMBER OF DOCUMENT 100 — 52nd ROW

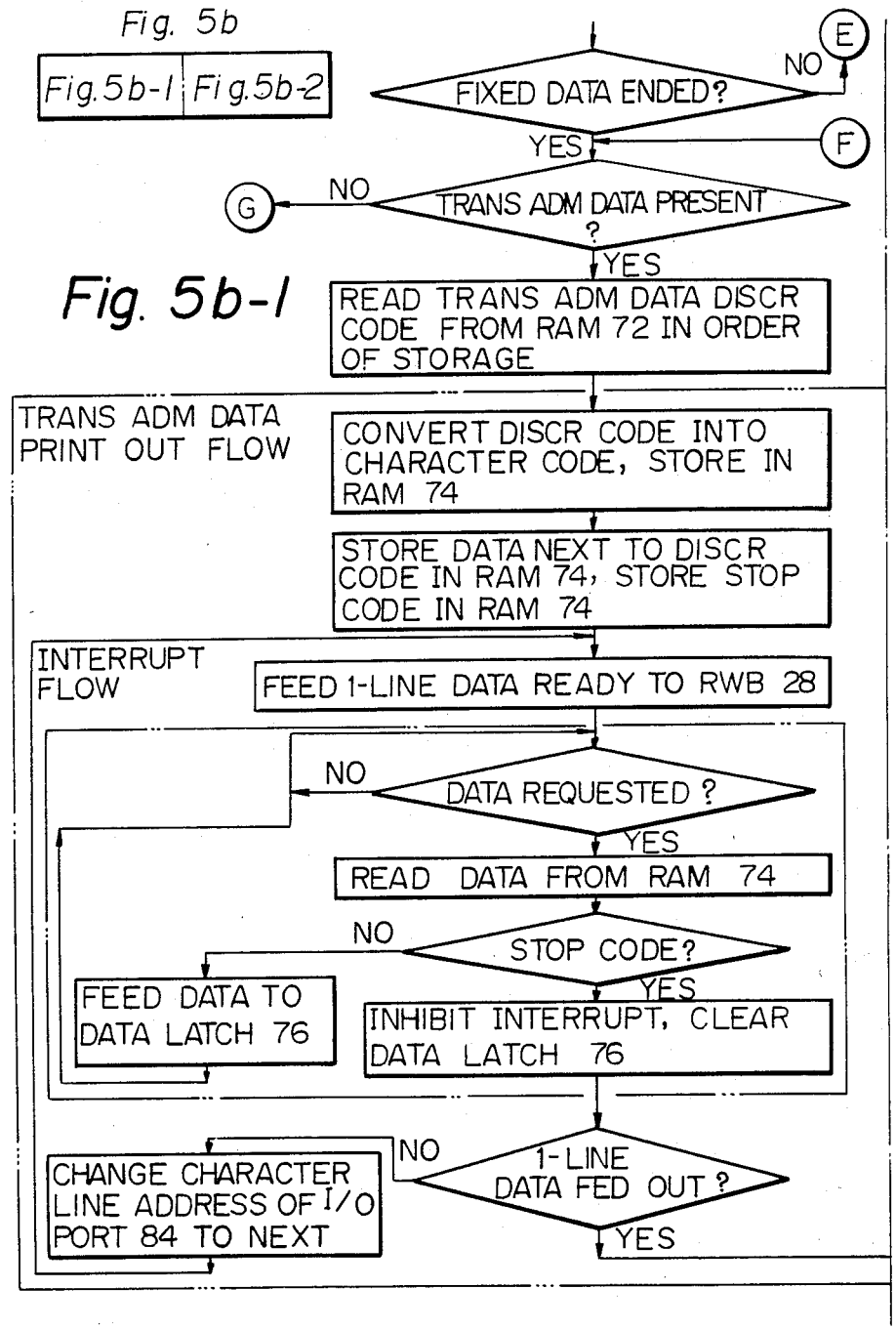

FACSIMILE COMMUNICATION DATA RECORDING APPARATUS FOR FACSIMILE TRANSCEIVER

BACKGROUND OF THE INVENTION

The present invention generally relates to facsimile transceivers and, more particularly, to a facsimile communication data recording apparatus for storing, accumulating and reading various administrant data which will be annexed to video data read from an original document during transmission or reception. The "administrant data", as distinguished from data on a document, may include another station's no. (ID), a communication opening time, a transmitted or received number of documents and a transmission or reception error. They may also include a transmission or reception speed, a resolution and other functional parameters.

What is important in the administration of a facsimile transceiver is grasping the time and kind of data transmission or reception, occurrence of a failure in communication and like administrant factors. Storing and recording such administrant data will prove particularly effective when a facsimile transceiver fails in its data reception mode, because administrant data are received automatically leaving no printed record.

With this in view, a prior art facsimile transceiver is furnished with a special printer to exclusively print out administrant data at the end of every communication. Such a printer for recording administrant data alone adds to the cost of a facsimile transceiver and invites an increase in the number of mechanical component elements which renders the maintenance proportionately troublesome.

SUMMARY OF THE INVENTION

It is an object of the present invention to store and record various administrant data without resort to an additional printer which would otherwise be needed by a facsimile transceiver for printing out such data.

It is another object of the present invention to automatically print out stored administrant data within a predetermined area of a paper sheet in a variable arrangement conforming to an amount thereof, when the amount of the stored data increases beyond predetermined one.

It is another object of the present invention to print out stored administrant data as those concerned with transmission and those concerned with reception separately from each other when the amount of the data exceeds predetermined one.

In order to achieve these objects, the present invention furnishes a facsimile transceiver with a facsimile communication data recording apparatus having a storage for storing various administrant data. At every communication, administrant data are stored in the storage and, upon an increase in the amount thereof to predetermined one, a receiver section of the transceiver is energized to print out the administrant data which are read from the storage. When all the administrant data are printed out without any trouble, the administrant data in the storage will be cleared. In a preferred embodiment, a key switch for commanding an administrant data print-out operation is positioned in a suitable accessible part of the apparatus so that administrant data can also be printed out by closing the key switch.

Administrant data read from the storage are printed out within a predetermined area of a paper sheet in a variable arrangement which conforms to an amount of the stored data.

Administrant data can be read from the storage and printed out as those concerning transmission and those concerning reception separately.

It is another object of the present invention to provide a generally improved facsimile communication data recording apparatus for a facsimile transceiver.

Other objects, together with the foregoing, are attained in the embodiments described in the following description and illustrated in the accompanying drawings.

BRIEF DESCRIPTION OF THE DRAWINGS

FIGS. 5b-(1-2) and 5c are flowcharts demonstrating operations of a microcomputer included in the embodiment of FIG. 5a;

DESCRIPTION OF THE PREFERRED EMBODIMENTS

While the facsimile communication data recording apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1B:
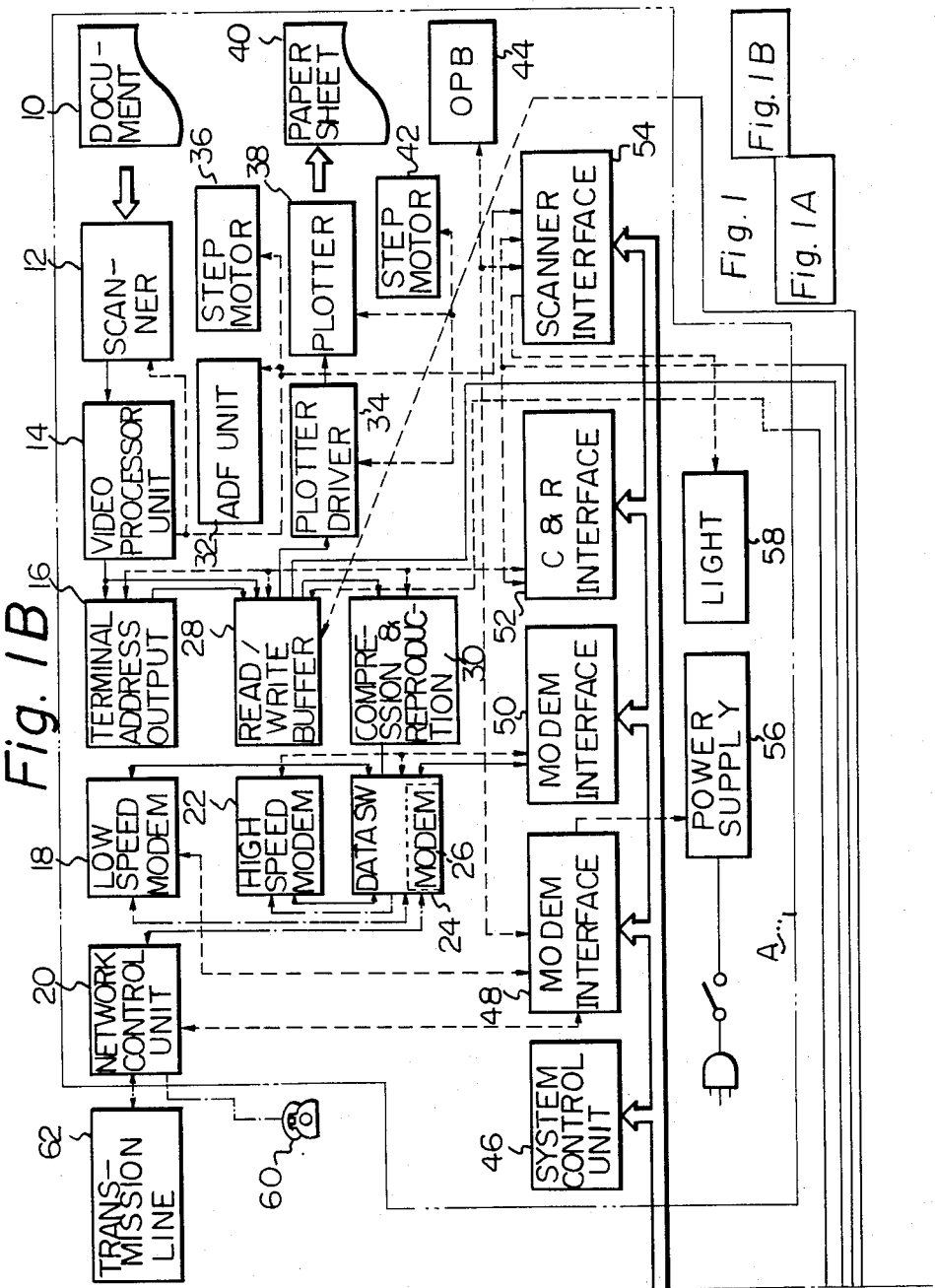
FIGS. 1 A and B are blocks diagrams showing a facsimile communication data recording apparatus embodying the present invention in combination with a facsimile transceiver to which the present invention is applicable.
Figure 2A:
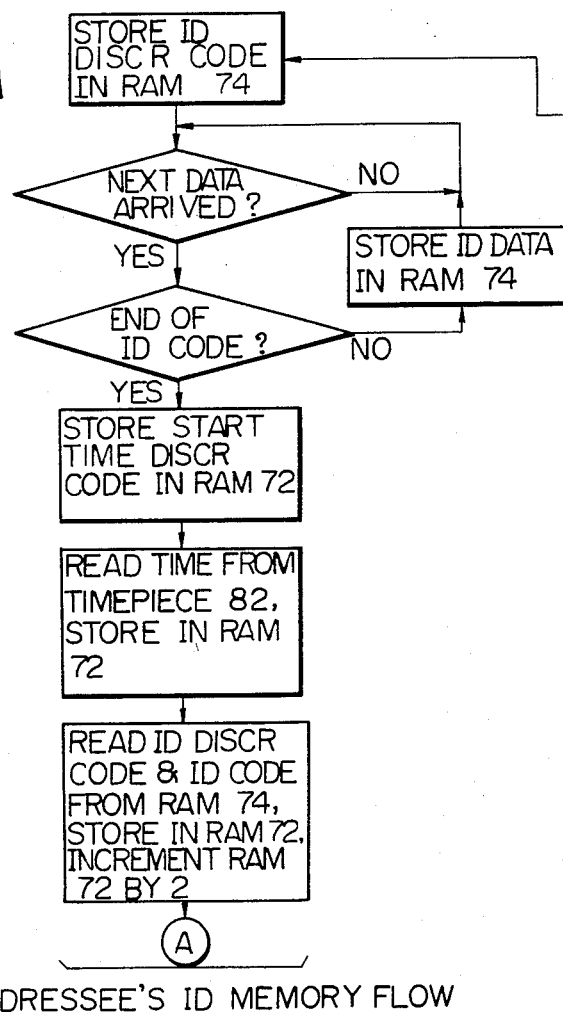
FIGS 2 A-D flowcharts demonstrating read/write control operations of a microcomputer included in the communication data recording apparatus.
Figure 2B:
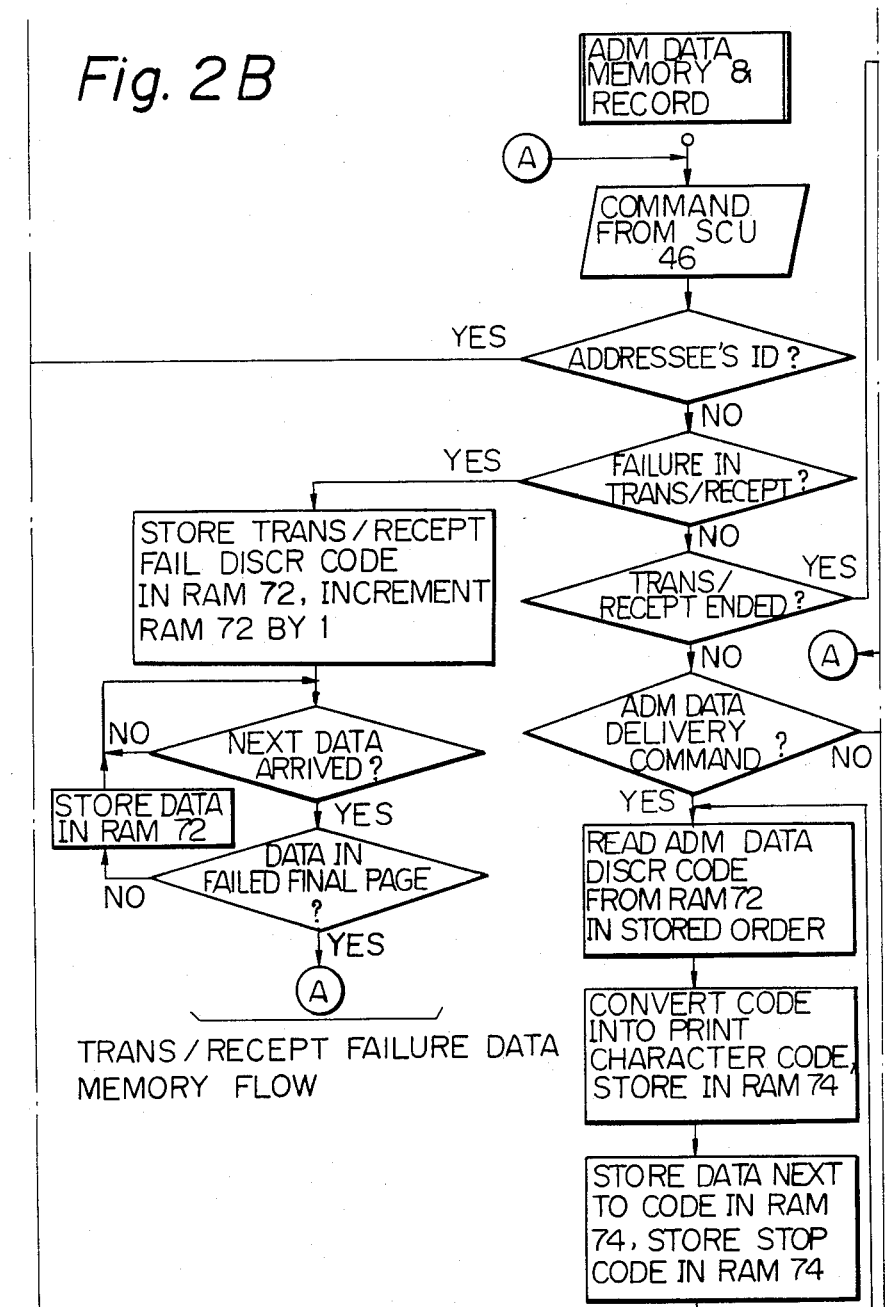
Figure 2C:
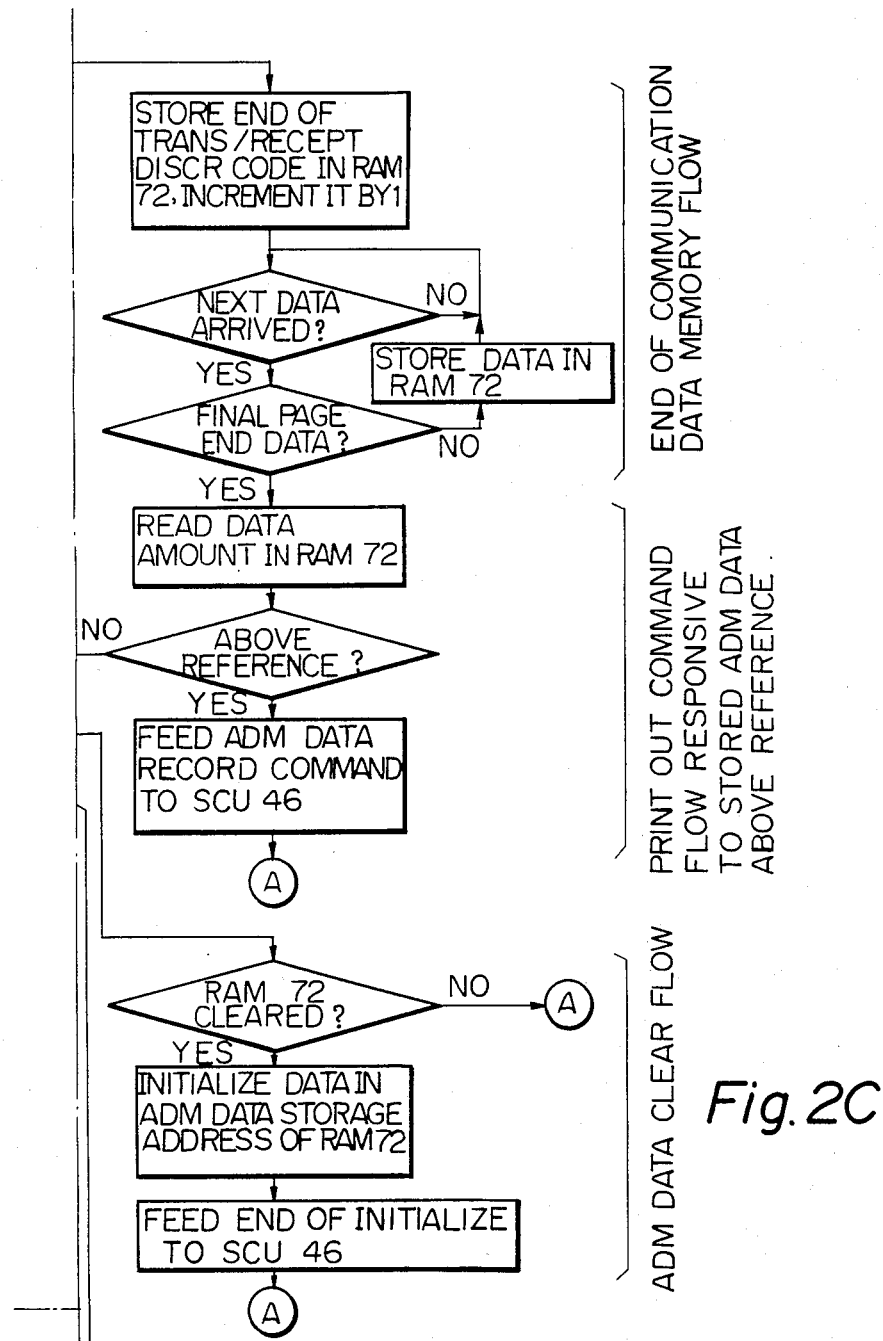
Figure 2D:
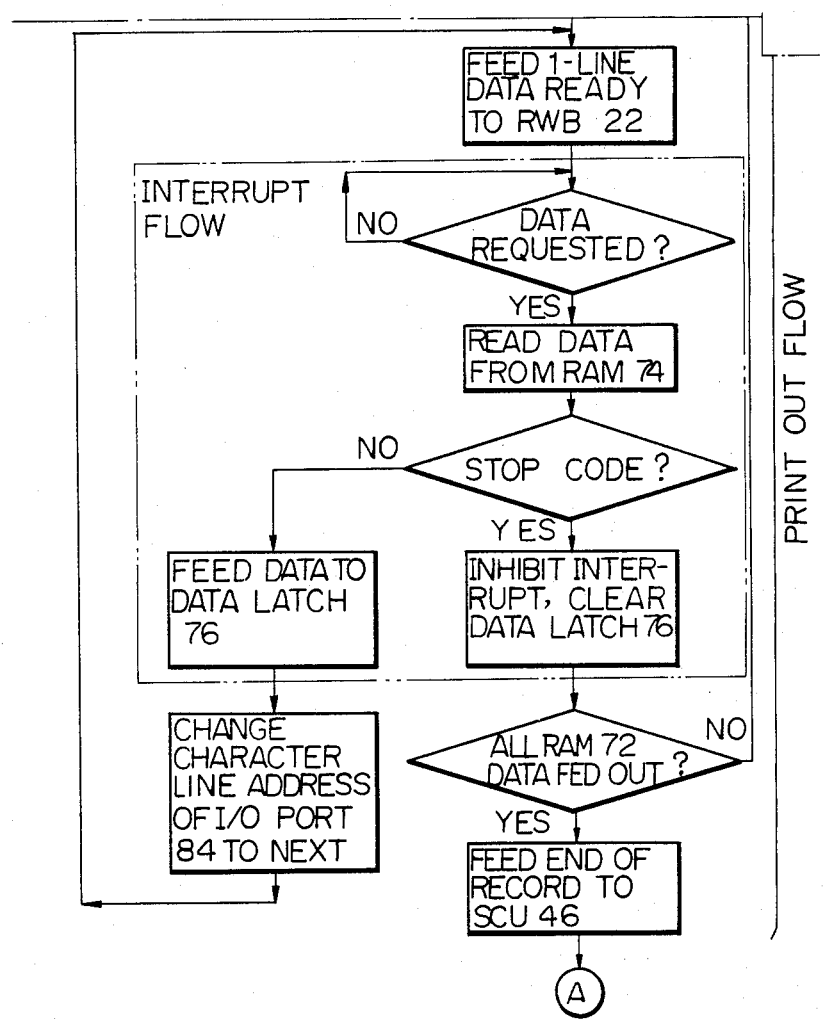
Figures 2, 3A:
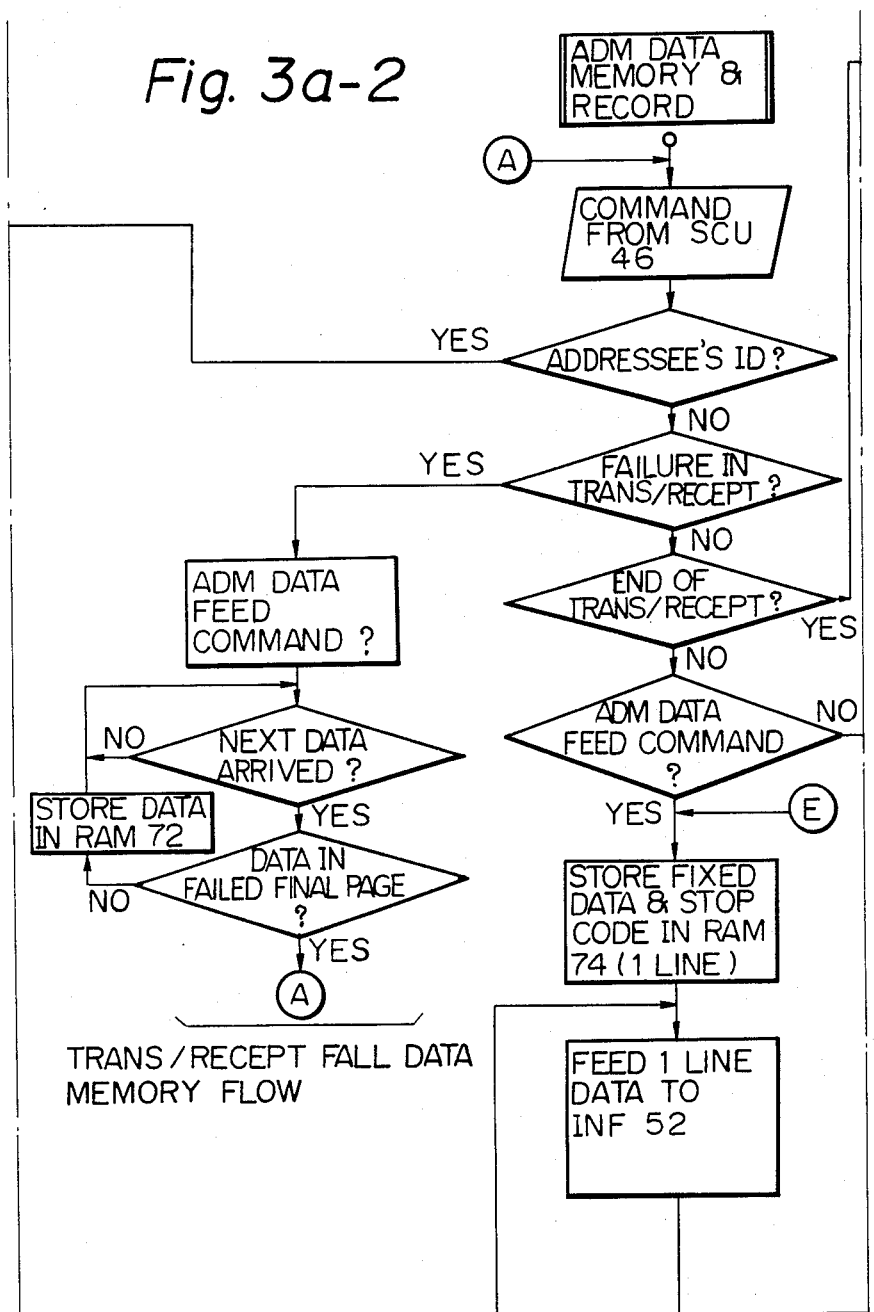
FIGS 3a -(1-5) and 3b-(1-4) are flowcharts demonstrating control operations of a microcomputer employed in another embodiment of the present invention.
Figures 3, 3A:
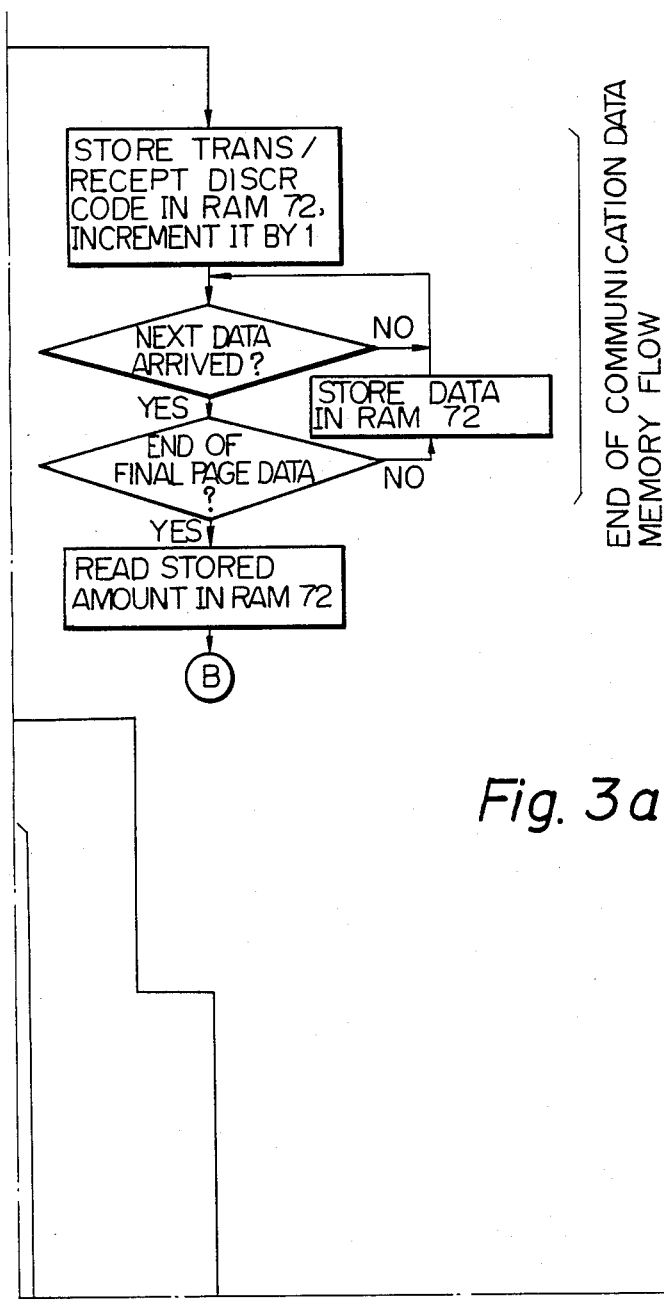
Figures 3, 3A, 4:
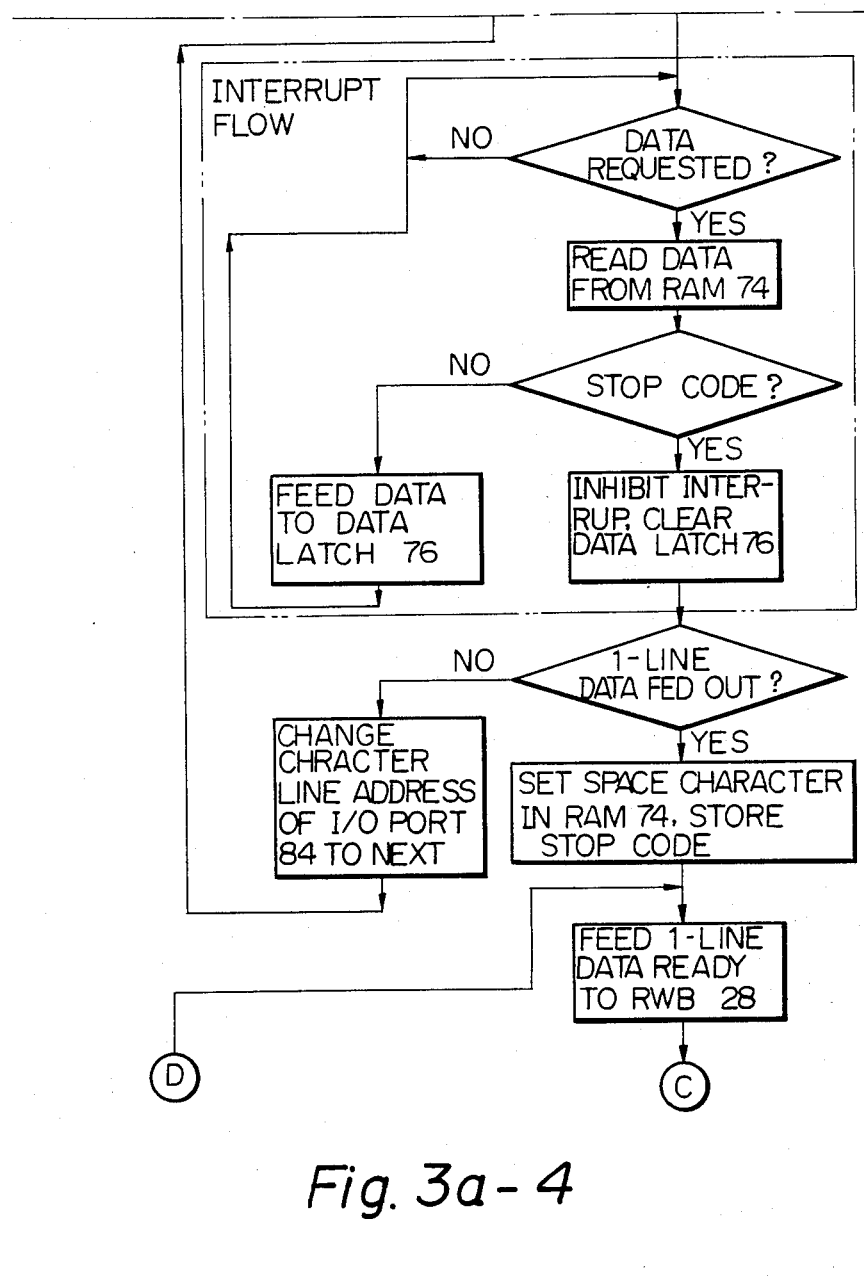
FIG. 4 is a plan view of an examplary arrangement of data printed out under the control of the microcomputer whose operations are indicated in FIGS. 3a and 3b.
Figures 3, 3A, 4, 5:
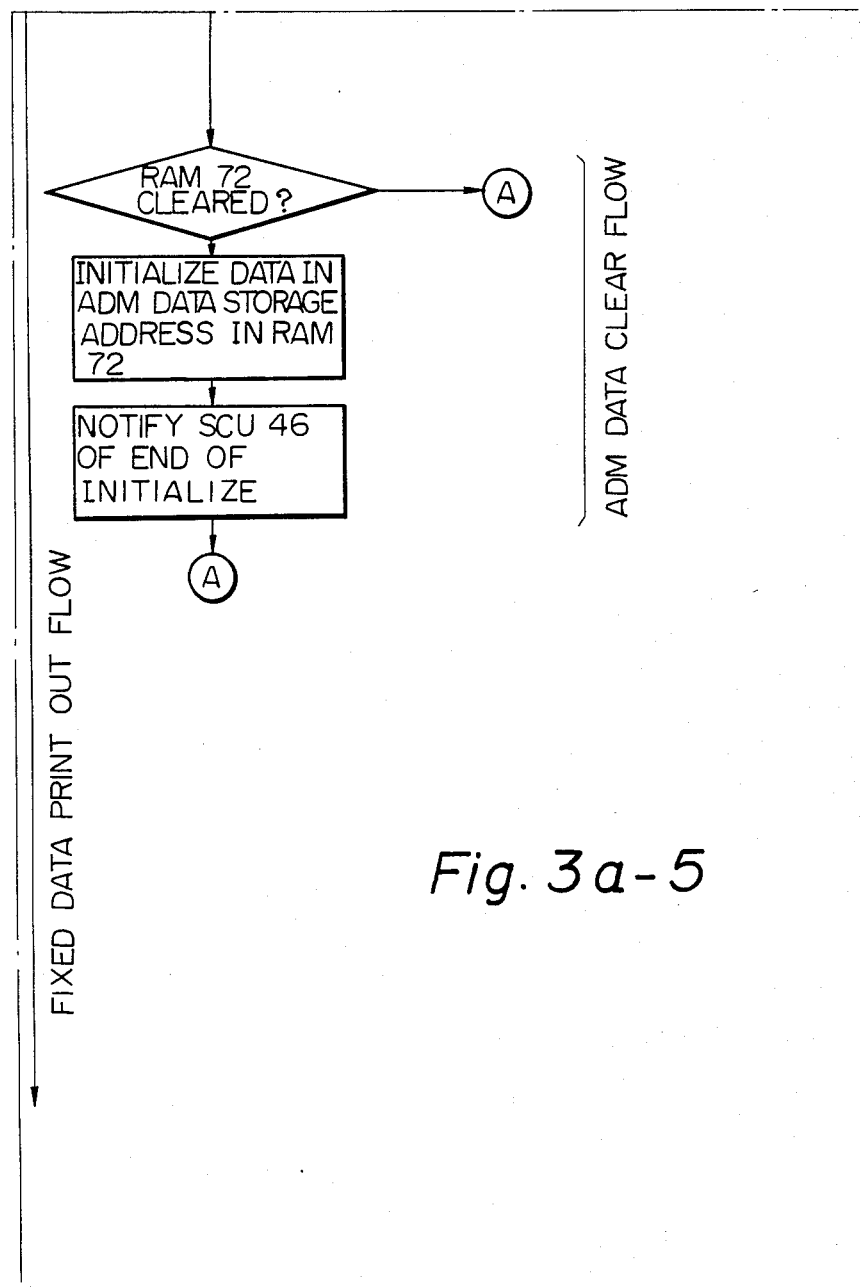
Figures 1, 3B:
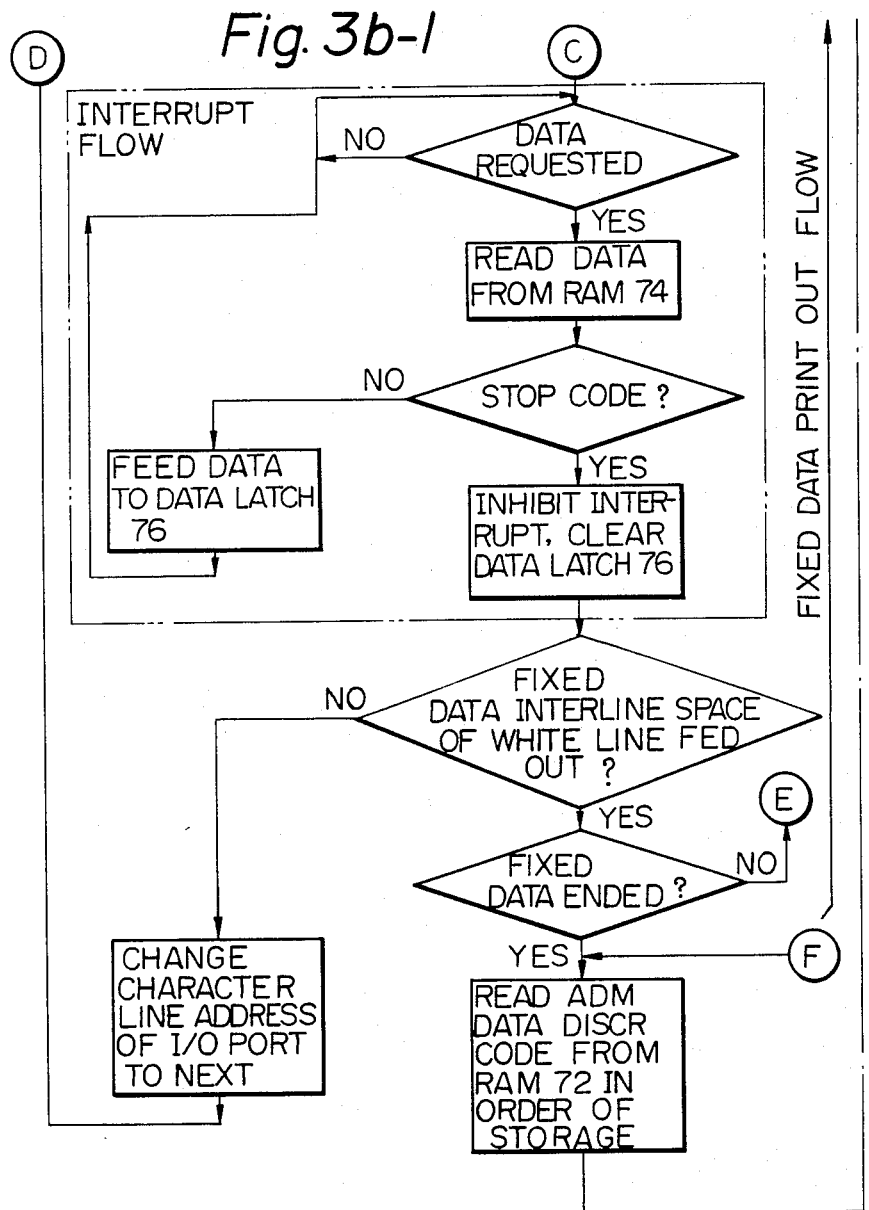

Referring to FIG. 1 of the drawings, there are shown an essential part A of a conventional facsimile transceiver and a part B embodying the present invention which is added to the conventional part A. First, the construction and operation of the conventional part A will be briefly described.

Facsimile data signals are all serial signals and they are transferred at a high speed. For this reason, data signal units are separated from control signal units whose speeds or rates of transfer are relatively low. An I/O interface is provided in one-to-one relation to each of the units or modules. In FIG. 1, flows of data signals are indicated by solid lines, those of analog signals by dot-and-dash lines and those of control signals by dotted lines. The control signal units and various mechanisms are controlled by a microcomputer. The design is such that one function is constituted by one unit as far as possible. Various functional units such as a scanner 12, a data compression and reproduction unit 30 and mudulation and demodulation units or modems 18, 22 and 26 are controlled by a system control unit 46 through corresponding interfaces such as a scanner interface 54, a data compression and reproduction interface 52 and modem interfaces 48 and 50. In a data reception mode of the apparatus, a signal supplied from a transmission line 62 is coupled to a network control unit 20 and therefrom to a data switch 24 adapted to distribute the input signal to the modems 18, 22 and 26. Of the demodulated signal, video data are passed through the data reproduction unit 30 and a read/write buffer 28 to a plotter driver 34 which then drives a plotter 38 to reproduce the data on a paper sheet. In a transmission mode, a video signal is processed by a video processor 14 and then supplied to the compression unit 30 via the read/write buffer 28. The compressed output of the compressor 30 is delivered to the modems 26, 22 and 18.

Data transmission or reception will be performed in the following procedure as prescribed by CCITT's advice T30.

(1) Call

An operator of the apparatus dials a desired addressee's number at a telephone 62.

(2) Confirmation of Addressee

The called station produces a 2100 Hz tone to inform the calling station of the fact that the called station is a terminal facsimile apparatus.

(3) Confirmation of Functions

The called station shows its functions to the calling station using a 300 bps low-speed modem.

(4) Instruction of Parameters

The calling station informs the called station of various transmission parameters (transmission rate of a high-speed modem, document size etc.) using a low-speed modem.

(5) Training

Matching the high-speed modem to the transmission line is carried out. The calling station supplies the called station with a predetermined data pattern to check an error rate in data transmission.

(6) Response after Training

After the training, the called station gives the calling station a response "ready to receive" if the error rate is lower than a reference value but a response "request re-training" if otherwise.

(7) Video Data Transmission

The calling station transmits video data to the called station through the high-speed modem.

(8) End of Transmission

The calling station shows the called station whether any other document is present thereat.

(9) Confirmation of Reception

The called station informs the calling station of a result of the data reception.

In a transmission mode, the apparatus A of FIG. 1 will process video data and transmission control data in the following manner.

Concerning video data, the scanner 12 optically reads data on a document 10 on a line by line basis (1 line=1/7.7 mm). After photoelectric conversion, the data are transformed into binary data, "1" and "0", by the video processor 14. The output of the video processor 14 is stored in the read/write buffer 28 while the document 10 is fed by one line by a stepping motor 36.

The read/write buffer 28 produces an output in response to a request from the data compression unit 30. Then the unit 30 compresses the input data without changing the original information. The compressed data is delivered to the high-speed modem 22 via the data switch 24. The modulated output signal of the modem 22 is passed to the transmission line 62 by way of the data switch 24 and network control unit 20. Further included in the conventional part A are an automatic document feeder 32, a terminal address output device 16, an electric power source 56, a device 58 for energizing a fluorescent lamp, and an operation board (OPB) 44 which includes an operating section and a display section.

Concerning data for transmission control, they are all programmed. The system control 46 produces a parallel data output which is transformed into a serial signal by a data switch interface 50. Then, check bits for checking a transmission error are added to the serial output of the switch interface 50 whereupon the composite signal is fed to the high-speed modem 22 or the low-speed modem 18 via the data switch 24. The modulated output of the modem 22 or 18 is coupled to the transmission line 62 through the data switch 24 and network control 20.

In a reception mode on the other hand, a modulated signal from the transmission line 62 is fed to the high-speed modem 22 via the network control 20 and data switch 24. The modem 22 demodulates the input signal into a digital signal which is supplied to the data reproduction unit 30. The reproduced data are stored successively in the read/write buffer 28. As the amount of data stored in the read/write buffer 28 exceeds one line of data, they are transferred to the plotter driver 34 one line of data at a time. At the same time, the stepping motor 42 feeds a paper sheet 40 by one line (1/7.7 mm). The plotter driver 34 functions to drive the plotter 38 at a high pressure so that electrostatic latent images are formed on the paper sheet 40.

Transmission control data are all read on software basis. A signal supplied from the transmission line 62 is fed to the high-speed modem 22 or the low-speed modem 18 through the network control 20 and data switch 24. The demodulated output of the modem 22 or 18, which is a digital signal, is coupled to the data switch interface 50 via the data switch 24. At this interface 50, an error in the transmission is checked while the digital signal is transformed into a parallel signal. Finally, the system control 46 takes the parallel signal thereinto to make it out.

Now, the construction and operation of the part B embodying the present invention will be described. A microcomputer (CPU) 70 is connected with the data and address lines in order to control reading and writing various administrant data with which the present invention is concerned. Connected with the CPU 70 are a non-volatile random access memory (RAM) 72 for storing administrant data, a second random access memory (RAM) 74 for storing data temporarily during data processing operation, a data holding circuit or data latch 76, a chip selector 78, a read only memory (ROM) 80 storing program data to control reading and writing administrant data, a time-piece circuit 82 and an input-/output port 84 for expansion. The RAM 72 is constantly supplied with power by a battery backup chip 88 to hold data written therein. The data latch 76 is supplied with a character code which designates an alphabetic character, for example, or a numeric character.

The character code is coupled to a read only memory (ROM) 86 which stores picture element data character by character so as to serve as a character generator. The ROM 86 is also supplied with video signal column codes from the CPU 70 through the I/O port 84. The video signal read out from the ROM 86 is coupled to a multiplexer 90 on a column by column basis. Having a timing pulse generator circuit therein, the multiplexer 90 transforms the parallel video data into a serial data and feeds it to the read/write buffer 28. Also, the multiplexer 90 receives system clock pulses from the recording section (plotter driver 34, plotter 38, stepping motor 42) and read/write buffer 28. While the read/write buffer 28 is requesting line data, the multiplexer 90 delivers an interruption request to the CPU 70 on a character by character basis in synchronism with the input system clock pulses.

In the facsimile apparatus shown in FIG. 1, some elements of the conventional part A are modified for practicing the present invention. The operation board 44 is provided with an additional key for commanding a print-out of administrant data and a lamp indicative of manipulation of the print-out key. The multiplexer 90 is connected with the read/write buffer 28 such that video data from the circuitry B are selected in an administrant data print-out mode but video data from the data compression/decompression unit 30 in a usual facsimile mode. Further, the system control 46 stores an additional program for supplying the CPU 70 with an addressee's no. (ID), a kind of failure during transmission or reception, an end of communication, an administrant data print-out command, a RAM 72 clear command etc., and a second additional program for preparing such data.

Reference will be made to FIG. 2 for describing an administrant data read/write control flows of the CPU 70 which are based on the program data stored in the ROM 80.

When a connection is established between the facsimile transceiver of FIG. 1 and another facsimile transceiver at a remote station, the system control 46 supplies the CPU 70 with the addressee's no. or ID and a transmission/reception discrimination code with an ID discrimination code and an end of ID code added to the head and tail, respectively. Upon arrival of the ID discrimination code, the CPU 70 stores said code and the following addressee's no. and transmission/reception discrimination code in the RAM 74. In response to the end of ID code, the CPU 70 continuously stores a start time discrimination code in the RAM 72 and reads the start time from the timepiece circuit 82 to store it also in the RAM 72. Further, the CPU 70 reads the ID discrimination code and addressee's ID from the RAM 74 and store them in the RAM 72. At this instant, "2" is added to the recorded amount of data in the RAM 72 and the sum is stored anew in the RAM 72. The procedure described so far is the addressee's ID memory flow demonstrated in FIG. 2.

When during communication either the addresser or addressee is disabled or errors larger than a predetermined value occur in the transmitted or received video data, a code indicating a kind of the failure and a code indicating the page number where the failure has occurred are produced. The CPU 70 stores such codes in the RAM 72, increment the RAM 72 by "1" and stores the sum anew therein. Such operations constitute the trans/recept failure data memory flow in FIG. 2.

At the end of the communication, the system control 46 opens the transmission line 62 and supplies the CPU 70 with an end of transmission/reception code and a final transmitted/received page number code. Then, the CPU 70 stores these codes in the RAM 72 and increment the RAM 72 by "1". This is the end of communication data memory flow of FIG. 2.

Next, the CPU 70 compares the recorded amount of data in the RAM 72 with a reference value. If the actual amount is above the reference value, the CPU 70 delivers a print-out command to the system control 46. This operation is indicated in FIG. 2 as a print-out command flow responsive to stored ADM data above reference.

In response to a print-out command from the CPU 70 or the operation board 44, the system control 46 commands the recording system of the major facsimile section A to perform a print-out operation while commanding the CPU 70 to produce the administrant data. Then, the CPU 70 reads one line (character line) of data out of the RAM 72 and loads it in the RAM 74. The CPU 70 also loads one stop code in the RAM 74 at the end of the one line of data. This completes loading one line of data. Thereupon, the CPU 70 notifies the read/write buffer 28 that it is ready to feed one line (picture element line) of video data. The CPU 70 reads the stored data (character codes) sequentially from the RAM 74 in synchronism with an interruption request coupled thereto, supplying the data to the data latch 74. It will be recalled here that an interruption request occurs in synchronism with a line data request from the read/write buffer 28 and system clock pulses and is fed to the CPU on a character by character basis. Meanwhile, the CPU 70 supplies the ROM 86 with a code indicative of the first line (picture element line) via the I/O port 84. Then, the video signal on the first picture element line of the first character line is loaded in the read/write buffer 28 and then printed out at a predetermined timing of the printer system. The CPU 70 monitors the line data request signal through the I/O port 84 and, upon a turn-off of said signal (meaning an end of one line of video signal reception), it supplies the ROM 86 with a code indicative of the second picture element line.

After feeding a data ready signal to the read/write buffer 28, the CPU 70 reads the first character code of the first character line sequentially out of the RAM 74 in synchronism with a data request signal from the read/write buffer 28 and system clock pulses in the manner previously described. The first character code thus read out is held by the data latch 76. After all the video data on the first character line have been produced, the data on the second character line in the RAM 72 are read and produced in the same way. Such a procedure will be repeated thereafter. As all the data in the RAM 72 are read and printed out, the CPU 70 feeds an end of record signal to the system control 46. The procedure so far described constitutes the print out flow shown in FIG. 2.

The system control 46 checks the conditions of various sensors in the printer system and, if they are all normal, it delivers a RAM 72 clear command to the CPU 70. Then, the CPU 70 clears the RAM 72 of the data and sends back an end of clear signal to the system control 46. This is the ADM data clear flow shown in FIG. 2.

The system control 46 also commands the printer system to print out data and the CPU 70 to produce administrant data in response to an administrant data print-out command which may be coupled thereto from the operation board 44. It will thus be seen that administrant data will be printed out when the amount of data stored in the RAM 72 reaches a predetermined amount or when a print-out command is delivered from the operation board 44, only if the printer system is free from failures, particularly paper troubles. It will also be seen that the data in the RAM 72 will be cleared when the printing operation is completed and only if no failure has been detected in the printer system.

As has been described, the apparatus shown in FIGS. 1 and 2 stores administrant data in a storage device and then print them out using a printer system and a print-out control logic originally furnished with in a conventional facsimile transceiver. This permits administrant data to be printed out with a minimum of additional factors, particularly those in the mechanical aspect, which promotes easy maintenance and a cut-down in cost.

Referring to FIGS. 3a, 3b and 4, a second embodiment of the present invention will be described. This embodiment has a design which meets the second object of the present invention, that is, to automatically print out administrant data within a predetermined area on a paper sheet when the amount of latched data exceeds predetermined one and in a variable arrangement conforming to the stored amount of data.

As will be seen from FIG. 3a, the second embodiment is essentially similar to the first concerning the addressee's no. (ID) memory flow, failure data memory flow, end of communication data memory flow and ADM data clear flow. Therefore, its operations in these flows will not be described herein.

When data are properly transmitted and received between two remote transceivers, none of the transceivers will have encountered troubles (paper jams etc.) and administrant data can be printed out at either station. In this situation, the CPU 70 compares the actual amount of data stored in the RAM 72 with a reference value which may be "50", for example. If the actual amount is larger than "50", the CPU 70 determines a specific spacing between adjacent character lines. In detail, a paper sheet is assumed to have a printing area which can accommodate three lines of fixed data and fifty lines of administrant data with eighty lines of spacing (80×⅛ mm=10 mm) between the fixed data lines and sixteen lines of spacing (16×⅛ mm=2 mm) between the annexed data lines. With this assumption, the 80-line spacing and 16-line spacing will be employed for the respective data as long as the number of administrant data lines is just 50. Even if more than 50 lines of administrant data are to be printed out, all the data must be accommodated within the same available area on a paper sheet. In such a case, the spacing between adjacent fixed data lines and that between adjacent administrant data lines are so reduced as to accommodate the 51st data line and onward. Then, the CPU 70 stores the modified spacings in its internal RAM or the RAM 74 and instructs the system control 46 to print out the data. Such a procedure is the interline space setting flow shown in FIG. 3b.

When a print-out command is delivered from the CPU 70 or the operation board 44 to the system control 46, the latter 46 supplies a print-out command to the printer system of the facsimile part A if with no failures therein, while commanding the CPU 70 to produce administrant data. In response to this command, the CPU 70 stores in the RAM 74 one line of the data indicative of the fixed data shown in FIG. 4 (the print-out data and time were read from the timepiece circuit 82) and a stop code. At the same time, the CPU 70 notifies the read/write buffer 28 that it is ready to feed one line (picture element line) of video data. Thereupon, the CPU 70 reads the data (character code) sequentially from the RAM 74 and couples them to the data latch 76 in synchronism with an interruption command which occurs at the timing previously described. Meanwhile, the CPU 70 supplies the ROM 86 with a code indicative of the first line (picture element line) via the I/O port 84. Then, the video signal on the first picture element line of the first character line is loaded in the read/write buffer 28 and then printed out at a predetermined timing of the printer system. The CPU 70 monitors the line data request signal through the I/O port 84 and, upon a turn-off of the signal (meaning an end of one line of video signal reception), it supplies the ROM 84 with a code indicative of the second picture line.

Subsequently, the CPU 70 feeds a data ready signal to the read/write buffer 28 and then reads the first character code of the first character line sequentially out of the RAM 74 in synchronism with a data request signal from the read/write buffer 28 and system clock pulses in the manner already discussed. The first character code thus read out is held by the data latch 76. The CPU 70 successively addresses the lines in the ROM 86 every time one line of data are fed out therefrom, until one line of data are all fed out. After one line of data delivery, the CPU 70 stores in the RAM 74 an all white video signal indicative of space characters and then a stop code. The CPU 70 then notifies the read/write buffer 28 that it is ready to feed out one line of data. The procedure described so far is the fixed data print out flow indicated by Ⓔ - Ⓒ in FIG. 3a.

Then, one line of all white data are fed out sequentially from the CPU 70 as was the case with the fixed data mentioned. As the number of the lines coincides with the number of lines or space between adjacent fixed data lines predetermined by the previous interline space setting flow, the operation returns to the fixed data print-out flow Ⓔ - Ⓒ of FIG. 3a whereby the next line of fixed data will be printed out. This is the fixed data print out flow from Ⓔ of FIG. 3a to E of FIG. 3b.

After the delivery of all the fixed data and all the interline spacings, the CPU 70 reads administrant data from the RAM 72 and delivers character video signals as in the case of fixed data. It will be seen that the spacing between adjacent administrant data lines was determined by the interline space setting flow. This is the procedure indicated by Ⓕ and onward in FIG. 3b.

In response to an administrant data print-out command from the operation board 44, the system control 46 also delivers a print-out command to the printer system while commanding the CPU 70 to supply the administrant data. It will be noted, however, that this time the operations do not involve the interline space setting flow and, therefore, both the fixed data and administrant data will be printed out at the standard spacings or numbers of space lines without any modification to the arrangement.

In this way, administrant data will be printed out when the amount of data stored in the RAM 72 exceeds predetermined one or when a print-out command is inputted through the operation board 44, on condition that the printer system is free from failures (particularly paper troubles). The data in the RAM 72 will be cleared on condition that no failure has been detected in the printer system in the course of the printing operation. Notably, paper sheets which can be filed and handled with ease will be provided by the automatic printing operation which occurs where the amount of stored data is larger than predetermined one, because all the sheets will then be recorded with data to a common length.

In the embodiment shown in FIGS. 3a, 3b and 4, an increase in the amount of stored data beyond predetermined one was coped with by modifying the interline spacings in such a manner as to accommodate all the data within a given length of recording sheet. If desired, however, the number of one character line of data may be controlled while maintaining the interline spacings constant. For instance, at least two kinds of data for each time of communication which can be printed out on one line may be specified in advance; where data X and data Y would run beyond a given number of lines in the predetermined area if printed out on different lines, the data X and Y will be printed out side by side on a common line and data X and Y for various times of communication will be printed out in the same manner until the number of all the lines coincides with the predetermined number.

As has been described, the apparatus illustrated in FIGS. 3a, 3b and 4 stores administrant data in a storage device and, using a received data recording section originally furnished with in a facsimile transceiver, automatically prints out all the stored data in a specific arrangement which can be accommodated within a predetermined area, every time the amount of stored data increases beyond a reference amount. This needs a minimum of additional factors, particularly mechanical elements, which promotes easy maintenance and a cut-down in cost. Additionally, paper sheets recorded with such data will have a common length which is favorable for the ease of file management.

Referring to FIGS. 5a–5c, 6a and 6b, a third embodiment of the present invention will be described. The apparatus illustrated is arranged to achieve the third object of the present invention, that is, to print out administrant data concerned with transmission and those concerned with reception separately when the amount of the latched data exceeds predetermined one.

Figure 5A:
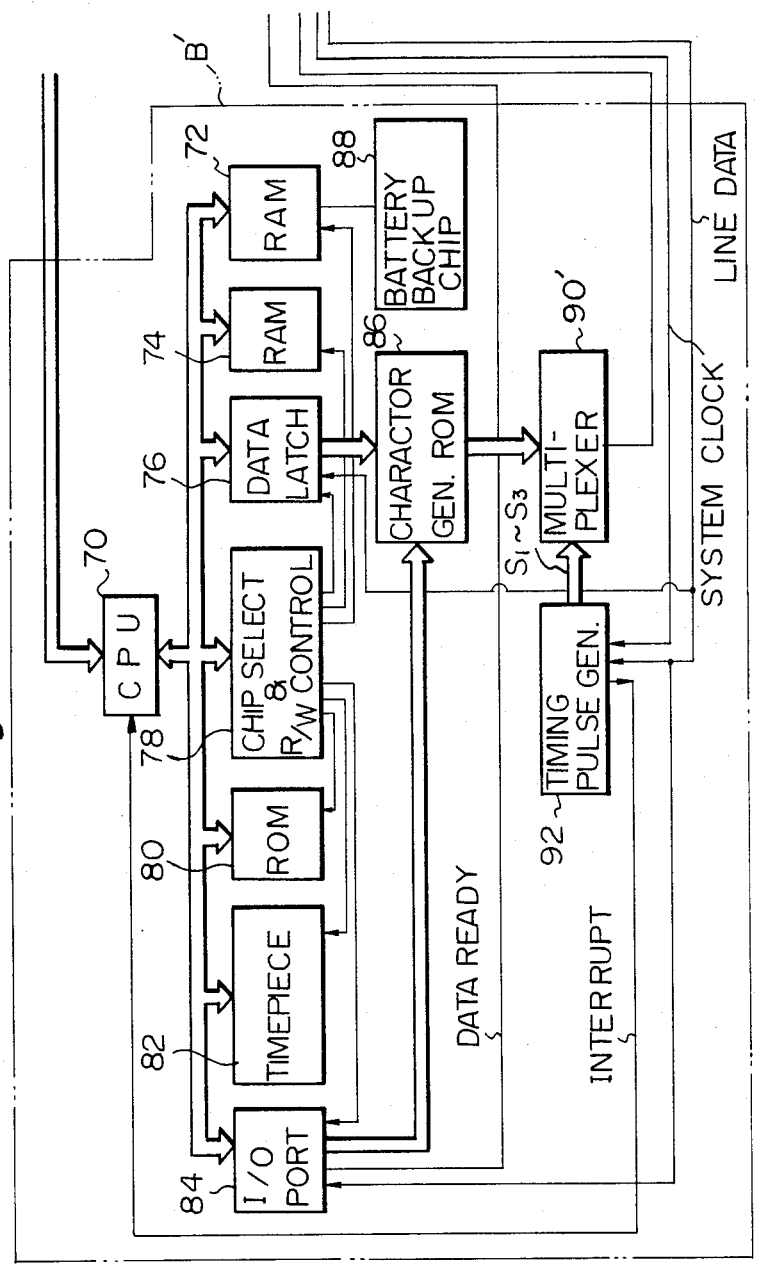
FIGS. 5a is a block diagram showing still another embodiment of the present invention.
Figures 2, 5B:
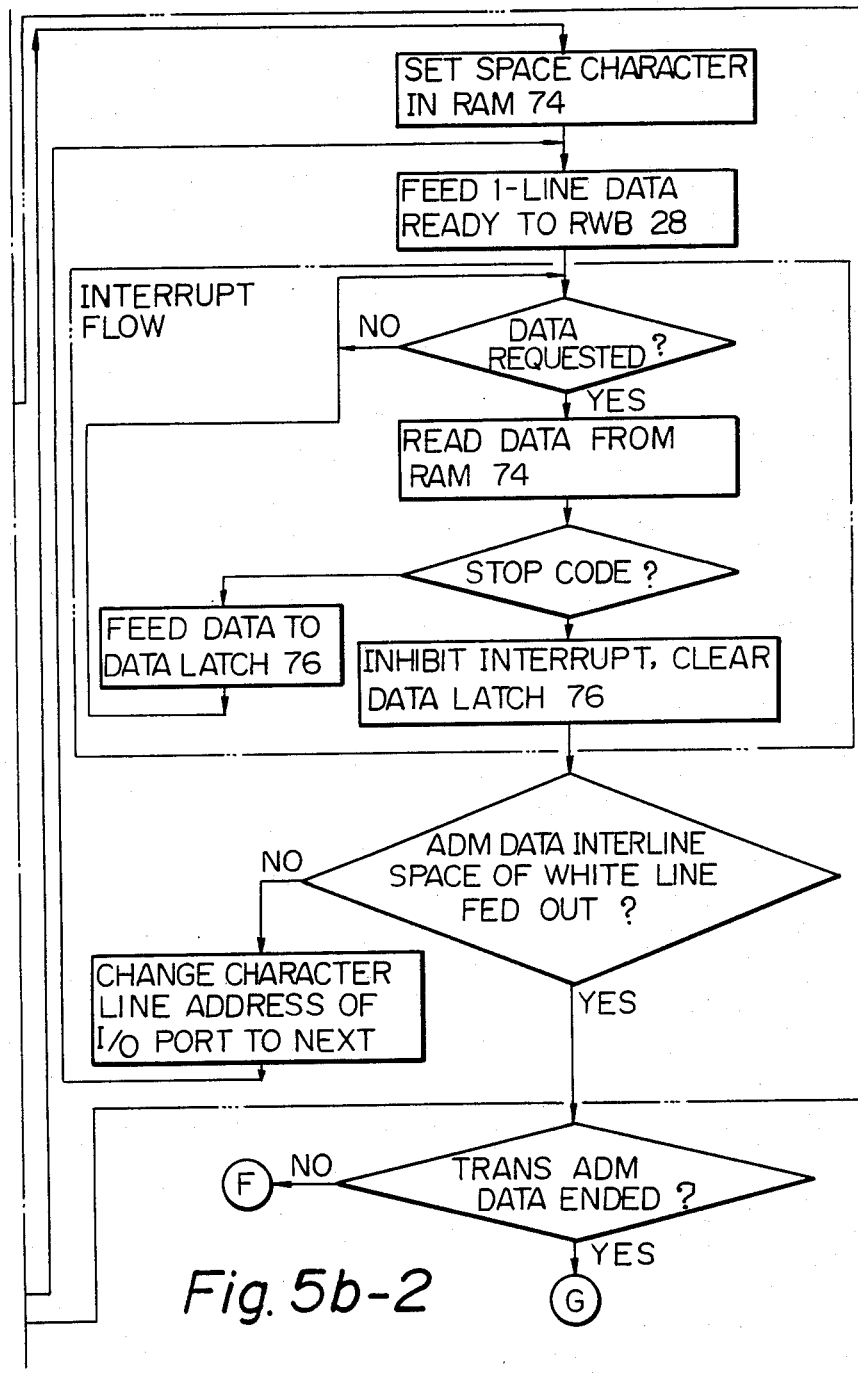
Figure 5C:
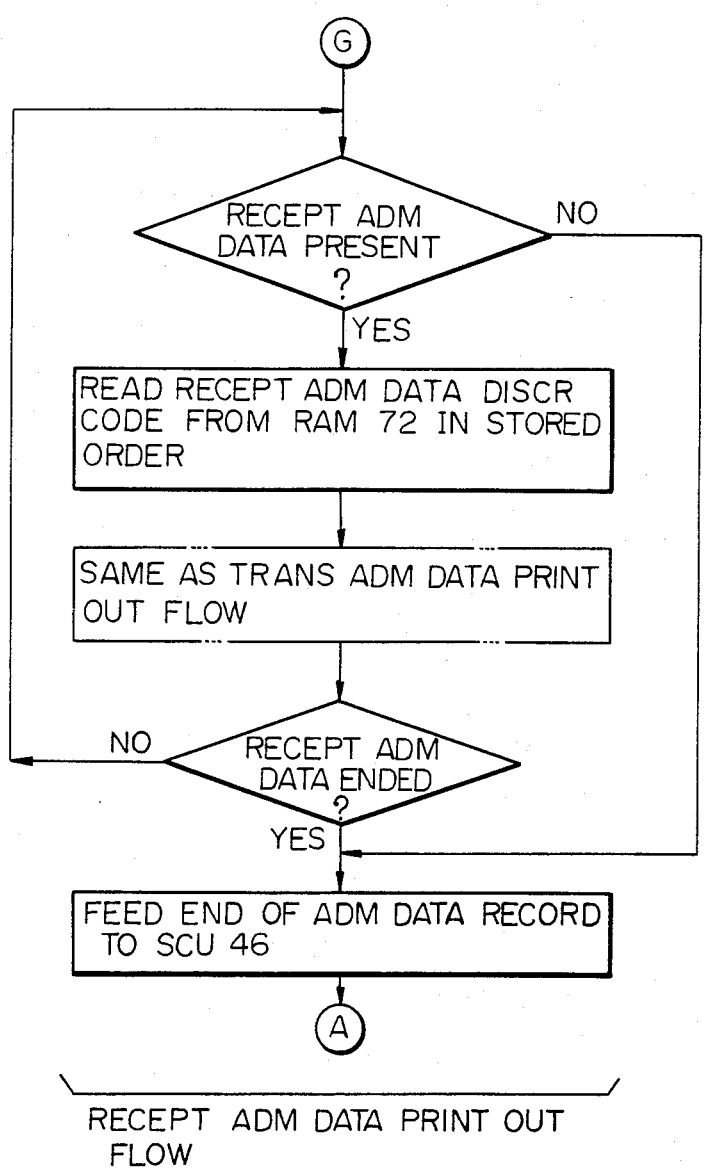

In FIG. 5a, a timing pulse generator circuit 92 is connected with a multiplexer 90'. Picture element address codes $S_1$–$S_3$ are selectively coupled from the timing pulse generator 92 to the multiplexer 90'. In response to the input code $S_1$–$S_3$, the multiplexer 90' specifies a picture element signal and transforms parallel video signals based on character lines into a serial video signal. This output of the multiplexer 90' is supplied to the read/write buffer 28. In response to system clock pulses from the recording section (plotter driver 34, plotter 38, stepping motor 42) and read/write buffer 28, the multiplexer 90' feeds an interruption signal to the CPU 70 on a character by character basis in synchronism with the input system clock pulses while the read/write buffer 28 is requesting line data.

Again, this embodiment is essentially similar to the foregoing embodiments concerning the addressee's no. (ID) memory flow, failure data memory flow, end of communication data memory flow, ADM data clear flow, fixed data print out flow and interline space setting flow.

Figure 6A:
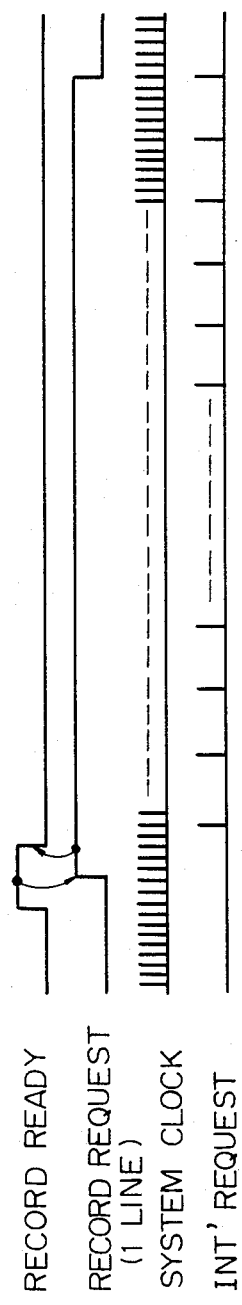
FIG. 6a is a timing chart showing various control signals which will be exchanged between a printer system and a video data timing generator during print-out operation of the embodiment shown in FIGS. 5a-5c.
Figure 6B:
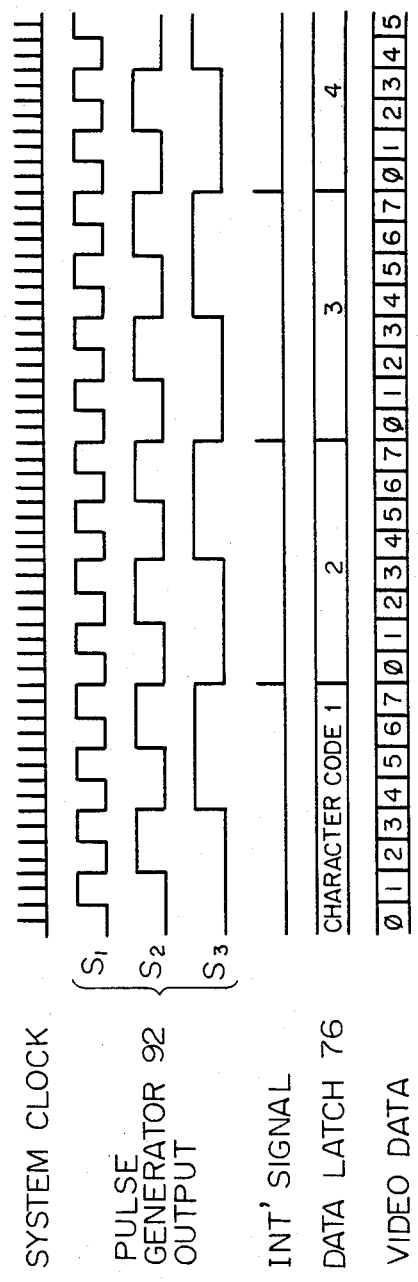
FIG. 6b is a timing chart showing control signals similar to those of FIG. 6a but on an expanded time base.

Subsequently, the CPU 70 feeds a data ready signal to the read/write buffer 28 and then reads the first character code of the first character line sequentially out of the RAM 74 in synchronism with a data request signal from the read/write buffer 28 and system clock pulses in the manner already discussed. The first character code thus read out is held by the data latch 76. The CPU 70 successively addresses the lines in the ROM 86 every time one line of data are fed out therefrom, until one line of data are all fed out. FIG. 6a is a timing chart showing the control signals which appear during one line of picture element data delivery. FIG. 6b shows output signals of the timing pulse generator 92. After one line of data delivery, the CPU 70 stores in the RAM 74 an all white video signal indicative of space characters and then a stop code. The CPU 70 notifies the read/write buffer 28 that it is ready to feed out one line of data. (See the procedure Ⓔ - Ⓒ shown in FIG. 3a.) Then, one line of all white data are fed out sequentially from the CPU 70 as was the case with the fixed data mentioned. As the number of the lines coincides with the number of lines or space between adjacent fixed data lines predetermined by the interline space setting flow, the operation returns to the fixed data print out flow E and onward of FIG. 3a whereby the next line of fixed data will be printed out. (See the procedure from E of FIG. 3a to Ⓔ of FIG. 3b.)

After the delivery of all the fixed data and all the interline spacings, the CPU 70 reads administrant data for transmission from the RAM 72 and delivers character video signals as in the case of fixed data. It will be seen that the spacing between adjacent administrant data line was determined by the previous interline space setting flow. This is the procedure Ⓕ - Ⓖ indicated in FIG. 5b.

After reading all the administrant data in transmission, the CPU 70 reads those in reception by the same procedure as that for the transmission administrant data. This part of the operation corresponds to the flow of FIG. 5c.

In this way, transmission administrant data and reception administrant data will be printed out separately from each other when the amount of data stored in the RAM 72 exceeds predetermined one or when a print-out command is inputted through the operation board 44, on condition that the printer system is free from failures (particularly paper troubles). The data in the RAM 72 will be cleared on condition that no failure has been detected in the printer system in the course of the printing operation. It is notable that paper sheets which can be filed and handled with ease will be provided by the automatic printing operation which occurs where the amount of stored data is larger than predetermined one, because all the sheets will then be recorded with data to a common length.

In the embodiment described above, transmission and reception administrant data were printed out in upper and lower portions of a recording area, respectively. Alternatively, they may be printed out in side by side relation. This is achievable merely by reading one line of transmission data and one line of reception data sequentially from the RAM 72 in the order of storage, storing them in the RAM 74 such that the head of one data will be aligned with the leftmost end of one character line and the head of the other with the midpoint, and supplying the printer system with character data as was the case with the previous embodiment.

As has been described, this embodiment stores administrant data in a storage device and, using a received data recording section originally furnished with in a facsimile transceiver, automatically prints them out separating them into transmission data and reception data every time the amount of stored data increases beyond a reference amount. This minimizes the number of additional factors, particularly mechanical elements, which promotes the ease of maintenance. The separate arrangement of the printed administrant data for transmission and reception will permit a person to readily locate and read a desired part of the data.

Throughout the foregoing embodiments, the administrant data were shown and described as comprising an addressee's ID, a communicated opening time, a kind of failure and a number of document pages. If desired, however, they may additionally include a transmission/reception speed, a resolution power and/or like parameters concerned with the operation mode with or without a communication closing time. Where both the mode parameters and communication closing time are desired, an arrangement may be made such that the system control 46 supplies the CPU 70 with the mode parameters together with the addressee's ID while the CPU 70 loads the RAM 72 with the mode parameters together with the ID in the addressee's no. memory flow; the CPU 70 reads data in the timepiece circuit 82 and loads it in the RAM 72 in both the fail data memory flow and end of communication data memory flow.

While a RAM 74 for temporary storage of data was employed in addition to a RAM 72, the RAM 72 may bifunction to store data in order to omit the RAM 74 and thereby simplify the whole arrangement. Though sheet number data was supplied from the system control 46 to the CPU 70, an alternative arrangement is possible in which the system control 46 feeds an end of page signal to the CPU 70 at the end of each page of communication, and the CPU 70 counting the input signals loads the RAM 72 with its updated count in response to a communication failure signal or an end of communication signal from the system control 46. Furthermore, the character generator 86 will be needless if the facsimile transceiver A includes a character generator for printing out an addressee's no. and others or its printer system can print out characters in response to coded inputs.

Various other modifications will become possible for those skilled in the art after receiving the teachings of the present disclosure without departing from the scope thereof.

What is claimed is:

1. A facsimile communication data recording apparatus for a facsimile transceiver having a transmitter and a receiver provided with a printing means, comprising:
   a central processing unit connected to the facsimile transceiver for controlling reading/writing operation of administrant data which is generated by the facsimile transceiver during operation thereof;
   memory means connected to the central processing unit for storing the administrant data at each time of communication by the facsimile transceiver; and
   control means for controlling the memory means and the printing means such that the administrant data stored in the memory means are read by the central processing unit and printed out by the printing means when an amount of the administrant data stored in the memory means reaches a predetermined value.

2. An apparatus as claimed in claim 1, in which the administrant data comprise those concerned with transmission and those concerned with reception, the control means being constructed to control the printing means to print out the transmission data and the reception data separately from each other.

3. An apparatus as claimed in claim 1, in which the control means is constructed to control the printing means to print out the administrant data on a paper sheet within a predetermined area thereon and in an arrangement which is determined by an amount of the administrant data stored in the memory means.

4. An apparatus as claimed in claim 1, in which the control means comprises an actuating means for actuating the printing means when the amount of the administrant data stored in the memory means reaches the predetermined value.

5. An apparatus as claimed in claim 4, in which the actuating means is constructed to actuate the printing means to print out the administrant data stored therein response to a print out command signal which is produced before the amount of the data reaches the predetermined value.

6. An apparatus as claimed in claim 5, in which the facsimile transceiver comprises an operation board provided with a print out key switch, the print out command signal being produced when the print out key switch is depressed, the actuating means being actuated in response to the print out command signal to drive the printing means.

7. An apparatus as claimed in claim 1, in which the control means is constructed to control the memory means such that the administrant data stored in the memory means are cleared after the data have been printed out by the printing means without failure.

8. An apparatus as claimed in claim 1, in which the memory means comprises a random access memory for storing the administrant data.

9. An apparatus as claimed in claim 8, in which the random access memory comprises a non-volatile memory.

10. An apparatus as claimed in claim 1, in which the facsimile administrant data comprise at least one of an identification number of another station, communication opening and closing times, a number of communicated documents, an occurrence of an error in communication, a communication speed or rate, and a resolution.

11. An apparatus as claimed in claim 1, in which said amount of administrant data is constituted by a number of character lines of the data.

12. An apparatus as claimed in claim 11, in which the control means comprises means for discriminating the administrant data and counting the character lines thereof.

* * * * *